United States Patent
Segars et al.

[11] Patent Number: 6,052,774
[45] Date of Patent: Apr. 18, 2000

[54] APPARATUS AND METHOD FOR IDENTIFYING EXCEPTION ROUTINES INDICATED BY INSTRUCTION ADDRESS ISSUED WITH AN INSTRUCTION FETCH COMMAND

[75] Inventors: Simon Anthony Segars, Fulbourn; Peter Logan Harrod; Andrew John Merritt, both of Cambridge, all of United Kingdom

[73] Assignee: ARM Limited, Cambridge, United Kingdom

[21] Appl. No.: 09/035,838

[22] Filed: Mar. 6, 1998

[30] Foreign Application Priority Data

Sep. 9, 1997 [GB] United Kingdom ............. 9719173

[51] Int. Cl.$^7$ ........................................ G06F 11/00
[52] U.S. Cl. .................. 712/200; 714/38; 714/39; 714/45; 714/54
[58] Field of Search .................. 712/227; 714/45, 714/54, 37, 38, 39

[56] References Cited

U.S. PATENT DOCUMENTS

| | | | |
|---|---|---|---|
| 5,390,305 | 2/1995 | Takahashi et al. | 712/244 |
| 5,537,559 | 7/1996 | Kane et al. | 712/244 |
| 5,680,620 | 10/1997 | Ross | 395/704 |
| 5,745,770 | 4/1998 | Thangadurai et al. | 710/260 |
| 5,857,094 | 1/1999 | Nemirovsky | 395/500 |

*Primary Examiner*—Meng-Ai T. An
*Assistant Examiner*—Gautam R Patel
*Attorney, Agent, or Firm*—Nixon & Vanderhye P.C.

[57] ABSTRACT

The present invention provides a debugger interface unit for a data processing apparatus, comprising a control register having a number of fields, each field corresponding to a particular exception routine, and each field being settable to indicate that the debugger wishes to identify an access to the corresponding exception routine. Further, an exception routine catch logic is provided to receive a first signal when a processor core within the data processing apparatus issues an instruction fetch command for an exception routine, and to determine from an instruction address issued with the instruction fetch command which exception routine is being fetched. In addition, the catch logic is arranged to reference the field of the control register corresponding to the determined exception routine to determine if that field has been set, and if the field has been set, to output a breakpoint signal to the processor core.

The above approach provides a particularly efficient technique for identifying accesses to exception routines when debugging software, such identification being independent of the base address of the exception routines.

17 Claims, 10 Drawing Sheets

APPARATUS AND METHOD FOR IDENTIFYING EXCEPTION ROUTINES INDICATED BY INSTRUCTION ADDRESS ISSUED WITH AN INSTRUCTION FETCH COMMAND

BACKGROUND OF THE INVENTION

1. Field of the Invention

The present invention relates to an apparatus and method for debugging software, and in particular to an apparatus and method that facilitates the identification of exceptions when debugging software for a data processing apparatus.

2. Description of the Prior Art

A typical data processing apparatus may have a processor core arranged to execute a sequence of instructions that are applied to data values supplied to the processor core. Typically, a memory may be provided for storing the instructions and data values required by the processor core. Further, it is often the case that one or more caches are provided for storing instructions and data values required by the processor core, so as to reduce the number of accesses required to the memory.

When debugging the software to be executed by such a data processing apparatus, it is known to use a debugger application executing on a computer (collectively referred to hereafter as a "debugger") to monitor the activity of the data processing apparatus as it executes the software.

The debugger can be arranged to interface with the data processing apparatus via an embedded "In Circuit Emulator" (ICE) unit provided within the data processing apparatus. Typically, such embedded ICE units will contain a few hardware breakpoint units, each hardware breakpoint unit having a number of breakpoint registers for storing attributes of instruction or data accesses that the debugger is interested in identifying, and a breakpoint comparator for comparing the attributes in the breakpoint registers with information received from the data processing apparatus about instruction or data accesses being initiated by the processor core. The breakpoint registers will typically include data registers, address registers and control registers for storing attributes of data, addresses or control signals, respectively. Further, mask fields may be provided to enable "don't care" states to be set up, for example when certain bits of the address are not of interest.

Each hardware breakpoint unit may be arranged to issue a breakpoint signal to the processor core if the breakpoint comparator matches the attributes of the breakpoint registers with corresponding attributes contained in the information about instruction or data accesses received from the data processing apparatus.

The breakpoint signal issued by a hardware breakpoint unit will cause the processor core to stop processing instructions, thereby enabling the debugger to analyse the current state of the data processing apparatus.

When debugging software executed by such a data processing apparatus, it is highly desirable to be able to trap whenever an exception occurs during the execution of the code. An example of such an exception might be a data abort, i.e. where a data memory access occurred to a non-existent memory location. In this case, the memory system would return an error, and the processor would branch to a special routine, known as an "exception routine" via an exception address known as a "vector" address, the exception routine being provided to handle the occurrence of a data abort.

One known technique for identifying an access to such an exception routine is to include in the breakpoint registers of one of the hardware breakpoint units attributes identifying the first instruction of that exception routine. By this approach, when the processor core issues an instruction fetch request including the address of that instruction, then the breakpoint comparator in the hardware breakpoint unit will match the instruction fetch request with the attributes in the breakpoint registers, and will issue the breakpoint signal.

However, there are two main disadvantages to the above approach. Firstly, in most microprocessors there are many different types of exceptions, and hence many different exception routines provided to handle those exceptions, each exception routine having different instruction addresses. Hence, there will typically be many different instruction addresses which would require breakpointing if the above approach were to effectively identify accesses to any of those exception routines. However, due to cost factors (eg silicon cost), an embedded ICE unit typically only contains a small number of hardware breakpoint units, and hence it is undesirable to restrict their use to identifying accesses to exception routines, this process often being termed in the art "Vector Trapping" or "Vector Catching".

As an example, the ARM microprocessor developed by Advanced RISC Machines Limited has eight types of exception, and hence eight exception routines, each with unique instruction addresses, but generally only has two hardware breakpoint units. The eight types of exception, along with their addresses, are indicated below:

| ADDRESS | EXCEPTION ROUTINE |
| --- | --- |
| 0x00000000 | Reset |
| 0x00000004 | Undefined Instruction |
| 0x00000008 | Software Interrupt |
| 0x0000000C | Prefetch Abort |
| 0x00000010 | Data Abort |
| 0x00000014 | Reserved |
| 0x00000018 | Interrupt |
| 0x0000001C | Fast Interrupt |

As will be noted from the table, certain bits of the address are the same for each exception routine. To enable all of these various types of exceptions to be identified by a single hardware breakpoint unit, "don't care" states typically have to be set up in the breakpoint address registers to ensure that the hardware breakpoint unit will identify an access to any of the exception routines. However, using such "don't care" states may mean that the processor core is stopped more often than it needs to.

An alternative approach is to employ a "software breakpoint" technique. When using a software breakpoint technique, a fixed pattern of bits is placed within the breakpoint data registers of a hardware breakpoint unit, and the breakpoint comparator will then always compare the information received about instruction accesses with that fixed pattern. Then, the first instruction of each exception routine is removed from memory and replaced with the fixed pattern of bits. By this approach, when the processor core issues an instruction fetch request to that address, the fixed pattern of bits will be retrieved, and the breakpoint comparator in the hardware breakpoint unit will then match that pattern of bits with the pattern of bits stored in the breakpoint registers, and hence issue the breakpoint signal to the processor core. This breakpoint signal will then cause the processor core to stop processing instructions, so that the debugger can then examine the state of the processor and/or memory.

However, if the software breakpoint approach is adopted, then this means that it is impossible to debug ROM code, since the instructions in ROM cannot be overwritten by the fixed pattern of bits. Further, if the data processing apparatus employs a cache, and if the instruction to be overwritten by the fixed pattern of bits is in the cache, then it may not be possible to overwrite that instruction in the cache, and so that instruction must be flushed from the cache, since otherwise the instruction will be returned from the cache without any access to the memory taking place, and hence without the fixed pattern of bits being retrieved. This is particularly disadvantageous if the code is stored in a "locked-down" portion of the cache, a locked-down portion typically being used to store a number of instructions that are used regularly by the processor core, and/or routines which require deterministic behaviour (ie determinable execution time), and hence should not be overwritten by new instructions retrieved from memory.

Another problem with the above identified techniques is that some microprocessors allow the location of the exception routines, or "vectors" as they are sometimes called, to be changed. For example, the MIPS architecture allows the vectors to move position based on the state of the "Bootstrap Exception Vector" (BEV) bit. For more information on the MIPS architecture, the reader is referred to the publication "MIPS Risc Architecture" by Gerry Kane, Prentice Hall ISBN 0-13-584293-X. The base of the vectors may be changed under software control without the debugger being aware of the change. This may mean that vector accesses are not caught when using the above described breakpoint techniques.

Given the above identified problems with the prior art approaches, it is an object of the present invention to provide an improved technique for identifying exceptions when debugging software.

SUMMARY OF THE INVENTION

Viewed from a first aspect, the present invention provides a debugger interface unit for a data processing apparatus, comprising: a control register having a number of fields, each field corresponding to a particular exception routine, and each field being settable to indicate that the debugger wishes to identify an access to the corresponding exception routine; an exception routine catch logic arranged to receive a first signal when a processor core within the data processing apparatus issues an instruction fetch command for an exception routine, and to determine from an instruction address issued with the instruction fetch command which exception routine is being fetched; the catch logic further being arranged to reference the field of the control register corresponding to the determined exception routine to determine if that field has been set, and if the field has been set, to output a breakpoint signal to the processor core.

In accordance with the present invention, the debugger interface unit, or the embedded ICE unit as it was referred to earlier, is adapted to include additional elements for facilitating the identification of exceptions when debugging software. These additional elements comprise exception routine catch logic that is arranged to receive a first signal when a processor core within the data processing apparatus issues an instruction fetch command for an exception routine. Further, a number of fields are provided within a control register of the debugger interface unit, each field corresponding to a particular exception routine, and each field being settable to indicate that the debugger wishes to identify an access to the corresponding exception routine.

The exception routine catch logic uses the instruction address issued with the instruction fetch command and the information stored in the fields of the control register to determine which exception routine is being fetched, and to output a breakpoint signal to the processor core if the corresponding field has been set.

The provision of such an exception routine catch logic frees any general hardware breakpoint units provided within the debugger interface unit for use for other purposes, since none of the hardware breakpoint units need to be reserved for identifying accesses to exception routines. Further, the identification of accesses to such exception routines is independent of the base address of the exception routines.

In preferred embodiments, the first signal is a signal output by the processor core on a control bus to request an instruction fetch for an exception routine to be performed. Preferably, the first signal consists of a signal output by the processor core to indicate that an instruction fetch is required (hereafter referred to as an InMREQ signal) and a qualifying signal to indicate that the instruction fetch relates to an exception routine. Typical debugger interface units, such as an embedded ICE unit, are already arranged to receive the InMREQ signal, and hence the debugger interface unit only needs to be adapted to receive the qualifying signal.

It will be appreciated by those skilled in the art that the size of the fields in the control register may be chosen at will, assuming sufficient space is available within the debugger interface unit. However, in preferred embodiments, each field contains a single bit to indicate whether the debugger wishes to identify an access to the corresponding exception routine. This provides the most efficient use of space in the control register.

The catch logic may be arranged to examine the whole instruction address issued with the instruction fetch command in order to determine which exception routine the instruction fetch command relates to. However, in preferred embodiments, the catch logic is arranged to determine from predetermined bits of the instruction address issued with the instruction fetch command which exception routine the instruction request command relates to. In situations where only a predetermined subset of the bits of the instruction address are needed in order to determine which exception routine is being accessed, then the above approach is more efficient than examining the whole instruction address.

In preferred embodiments, the debugger interface unit further comprises an input terminal for receiving information about instruction or data accesses being initiated by the processor core; one or more hardware breakpoint units, each breakpoint unit having a number of breakpoint registers for storing attributes of instruction or data accesses that are to cause the breakpoint signal to be sent to the processor core, and a breakpoint comparator for comparing the attributes in the breakpoint registers with the information received at the input terminal; each breakpoint unit being arranged to issue said breakpoint signal if the breakpoint comparator matches the attributes in the breakpoint registers with corresponding attributes contained in the information received by the input terminal.

As mentioned earlier, such hardware breakpoint units can be used to cause breakpoint signals to be issued when predetermined events occur. In addition to storing specific attributes of addresses, instructions, data values, or signals output on control buses, the breakpoint registers may also store mask information, such that certain attributes can be masked out, in effect providing a "don't care" function.

Hence, a data mask can be added to the breakpoint registers to indicate that the breakpoint comparator should not be concerned with certain portions of the data values returned, and instead, the breakpoint comparator will use other attributes for comparison, such as the address of instructions or data values issued by the processor core.

As mentioned earlier, by using the catch logic to perform the identification of accesses to exception routines, any such hardware breakpoint units provided are free to be used for other purposes, and none of the hardware breakpoint units need to be reserved for identifying exception routine accesses.

In preferred embodiments, the input terminal is connected to an address bus, a data bus, and a control bus for receiving the information about instruction or data accesses being initiated by the processor core. The attributes stored within the breakpoint registers may relate to addresses, data (including instruction data), or attributes for signals output on the control bus, and hence in preferred embodiments the input terminal needs to receive information from the address bus, the data bus, and the control bus in order for the hardware breakpoint units to have access to all the necessary information required.

In preferred embodiments, the debugger interface unit further comprises a logic gate for receiving the breakpoint signal issued by any of the breakpoint units or the catch logic, and for outputting a single signal to the processor core. If the breakpoint signal takes the form of a logic "1" value, then the logic gate is preferably an OR gate.

Further, in preferred embodiments, the debugger interface unit further comprises an interface for receiving attributes from the debugger for storing in the breakpoint registers. This interface preferably takes the form of a serial interface such as an IEEE Standard 1149.1–1990 JTAG serial interface, whereby the debugger interface unit can scan in data to be added to the breakpoint registers.

In preferred embodiments, the control register has a further field settable to indicate that a stepping process is to be employed, the debugger interface further comprising: a state machine arranged to receive a second signal when a processor core within the data processing apparatus requests an instruction fetch to take place, the state machine being arranged to keep a record of the number of instruction fetches requested by the processor core; the state machine further being arranged to reference the control register to determine whether the further field has been set, and, if the further field has been set, to output the breakpoint signal to the processor core once a predetermined number of instruction fetches have been requested by the processor core.

In prior art debugger interface units, such a stepping process would typically be performed by using one of the hardware breakpoint units. However, the provision of the state machine as defined above frees up the hardware breakpoint units to be used for other purposes, since one of the hardware breakpoint units does not need to be reserved for performing the stepping process.

Preferably, the predetermined number of instruction fetches is two, and the stepping process is a single stepping process. Typical debugger interface units, such as an embedded ICE unit, are sensitive to a signal indicating when an instruction fetch is taking place. Hence, the state machine merely needs to keep a record of those signals, and, in accordance with preferred embodiments, when the second of those signals is received, then the breakpoint signal is asserted. By this approach, the next instruction is executed, and the processor then enters the debug state before doing anything else.

Preferably, the second signal is a signal output by the processor core on a control bus to request an instruction fetch to be performed (hereafter referred to as an InMREQ signal). As mentioned earlier, typical debugger interface units, such as an embedded ICE unit, are already arranged to receive the InMREQ signal, and hence all that is required is for the state machine to keep a record of the number of InMREQ signals received.

Viewed from a second the present invention provides a data processing apparatus, comprising: a processor core for executing instructions; and a debugger interface unit in accordance with the first aspect of the present invention.

In accordance with this second aspect of the present invention, the debugger interface unit and the processor core are combined in one circuit, which may be provided independently of any other elements such as memory or cache.

The data processing apparatus may also include a number of other features, such as a memory directly accessed by the processor core, or a memory used in conjunction with one or more caches. In accordance with the Von Neumann architecture, a single cache may be provided for storing both instructions and data. However, in preferred embodiments, a Harvard architecture is employed, and the data processing apparatus hence further comprises: an instruction cache for storing instructions; a data cache for storing data; an instruction address bus and an instruction data bus being arranged to connect the instruction cache with the processor core, the instruction address bus enabling the processor core to output instruction addresses to the instruction cache, and the instruction data bus enabling the processor core to receive instructions corresponding to those instruction addresses; and a data address bus and a data data bus being arranged to connect the data cache with the processor core, the data address bus enabling the processor core to output data addresses to the data cache, and the data data bus enabling the processor core to receive data values corresponding to those data addresses, or to output data values to the data cache.

Preferably, the input terminal of the debugger interface unit is connected to the instruction address bus and the instruction data bus for enabling the one or more hardware breakpoint units to receive the necessary information about instruction accesses required by the breakpoint comparator. Further, the input terminal of the debugger interface unit is connected to the data address bus and the data data bus for enabling the one or more hardware breakpoint units to receive the necessary information about data accesses required by the breakpoint comparator.

Further, the input terminal can be connected to both an instruction control bus and a data control bus in order to receive the necessary information that may be required by the hardware breakpoint units concerning signals output on these control buses.

Viewed from a third aspect, the present invention provides a method of operating a debugger interface unit for a data processing apparatus to identify an access to an exception routine, comprising the steps of: (a) providing a number of fields within a control register, each field corresponding to a particular exception routine; (b) setting one of said fields to indicate that the debugger wishes to identify an access to the corresponding exception routine; (c) receiving a first signal when a processor core within the data processing apparatus issues an instruction fetch command for an exception routine; (d) determining from an instruction address issued with the instruction fetch command which exception routine is being fetched; and (e) if the field of the control register corresponding to the exception routine determined at said step (d) has been set, outputting a breakpoint signal to the processor core.

BRIEF DESCRIPTION OF THE DRAWINGS

The present invention will be described further, by way of example only, with reference to preferred embodiments thereof as illustrated in the accompanying drawings, in which.

DESCRIPTION OF A PREFERRED EMBODIMENT

Figure 1:
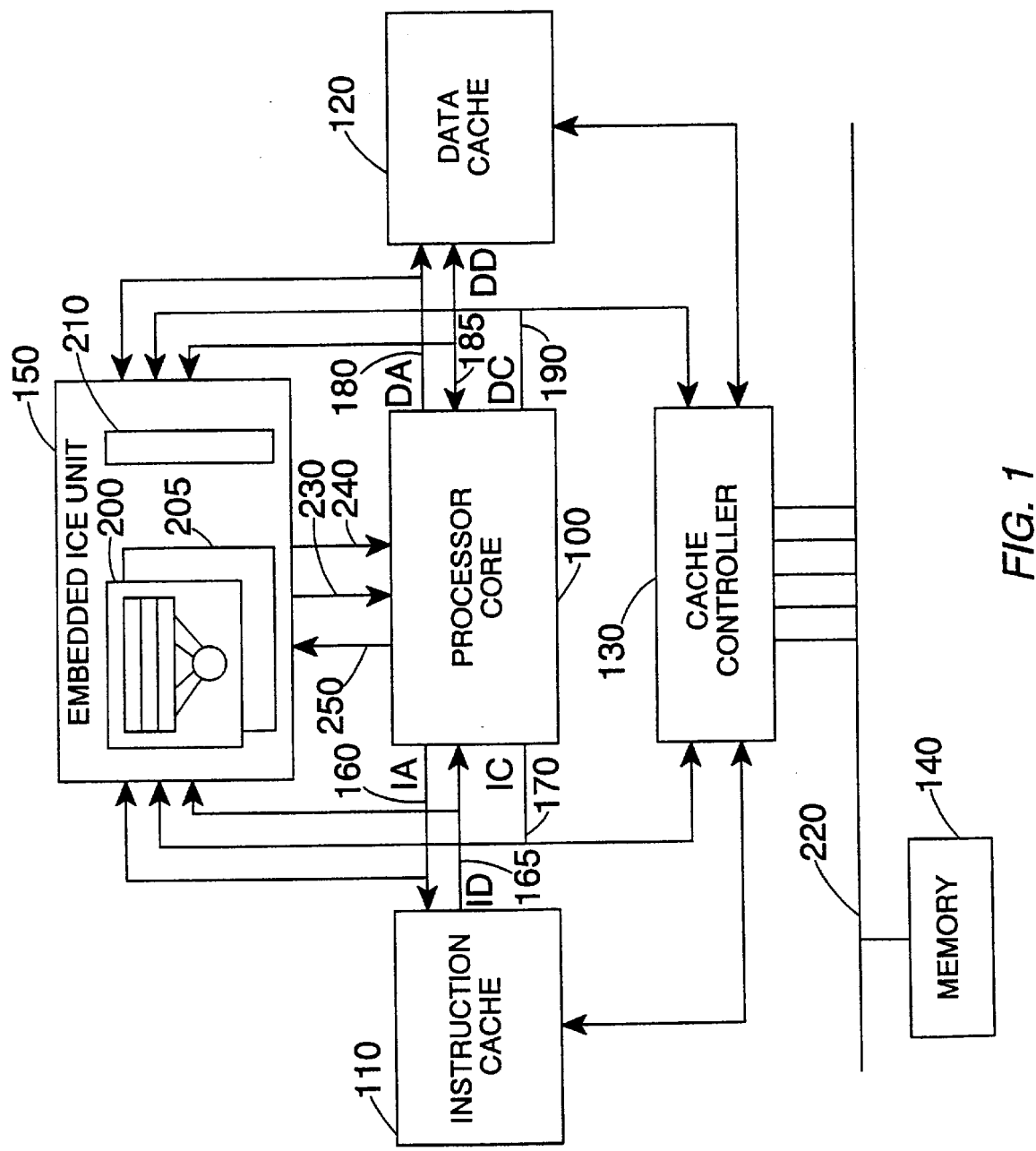
FIG. 1 illustrates a data processing apparatus in accordance with a first embodiment of the present invention, in which the data processing apparatus has a Harvard architecture.

FIG. 1 illustrates a data processing apparatus in accordance with the first embodiment of the present invention, in which the data processing apparatus employs a Harvard architecture having a separate instruction cache and a separate data cache.

As illustrated in FIG. 1, the processor core 100 is connected to an instruction cache 110 via instruction bus lines, and to a data cache 120 via data bus lines. A single cache controller 130 is shown for controlling both the instruction cache 110 and the data cache 120. However, alternatively, separate cache controllers may be provided, one for the instruction cache 110 and one for the data cache 120.

When the processor core 110 requires an instruction, it places the memory address of that instruction on the instruction address bus 160, and also issues a processor control signal on the instruction control bus 170. The processor control signal includes information such as whether the address corresponds to a read or a write request, the type of access (e.g. sequential), the size of the access (e.g. word, byte), the operating mode of the processor (e.g. supervisor or user), etc. This processor control signal is received by the cache controller 130, and prompts the cache controller to determine whether the required instruction is stored within the instruction cache 110.

In preferred embodiments, the processor control signal placed on the instruction address bus 160 when the processor core 100 requires an instruction to be retrieved is an Instruction Memory Request (InMREQ) signal, this signal informing the cache controller 130 that the instruction cache 110 should compare the address on the instruction address bus 160 with the addresses in the instruction cache 110 to determine whether the instruction corresponding to that address is stored within the cache. If so, the instruction is output from the instruction cache 110 on the instruction data bus 165, where it is then read by the processor core 100. If the instruction corresponding to the address is not within the cache 110, then the cache controller 130 causes the instruction to be retrieved from memory 140 via the external bus 220. The retrieved instruction is then stored in the cache 110 and returned to the processor core 100 over the instruction data bus 165.

Similarly, addresses for data values may be output on the data address bus 180, and a signal to indicate to the memory system that a data fetch is required (hereafter referred to as a Data Memory Request (DnMREQ) signal) is then output on the data control bus 190 to the cache controller 130. This will cause the data cache 120 to return the data value corresponding to that address on the data data bus 185 if that data value is stored within the data cache, or otherwise the cache controller 130 will retrieve the data value from the memory 140, at which point the data value will be stored in the data cache 120 and returned to the processor core 100 over the data data bus 185. Additionally, the processor core 100 can output data values to be stored in the data cache on the data data bus 185.

In accordance with preferred embodiments of the present invention, the data processing apparatus is further provided with an embedded ICE unit 150, which is used as a debugger interface unit to an external debugger application executing on a computer such as a PC, this debugger application being referred to hereafter as a "debugger". In preferred embodiments, the embedded ICE unit 150 contains two hardware breakpoint units 200 and 205, each hardware breakpoint unit having a number of breakpoint registers for storing attributes of instruction or data accesses that the debugger is interested in identifying, and a breakpoint comparator for comparing the attributes in the breakpoint registers with information received from the data processing apparatus about instruction or data accesses being initiated by the processor core. This information from the data processing apparatus is provided over the various instruction bus lines 160, 165, 170 and/or the various data bus lines 180, 185, 190. Each hardware breakpoint unit may be arranged to issue a breakpoint signal to the processor core if the breakpoint comparator matches the attributes of the breakpoint registers with corresponding attributes contained in the information about instruction or data accesses received from the data processing apparatus.

To allow the debugger to update the breakpoint registers within the hardware breakpoint units 200 or 205, a serial interface such as a JTAG serial interface may be provided, whereby the debugger interface unit can scan in data to be added to the breakpoint registers. New attributes to be stored within the breakpoint registers may be provided to the debugger interface unit, these parameters then being stored into the breakpoint registers for subsequent use by the breakpoint comparators.

Each breakpoint comparator may, at any instant in time, be arranged to look at either instruction information from the instruction buses 160, 165, 170 or data information from the data buses 180, 185, 190. If the breakpoint comparator is analysing instruction information from the instruction buses, and obtains a match with the attributes of the breakpoint registers, then a breakpoint signal is issued over path 230 to the processor core. However, if the breakpoint comparator is arranged to analyse data information from the data buses 180, 185, 190, and obtains a match with the attributes of the breakpoint registers, then a "watchpoint" signal is issued over path 240 to the processor core 100. For the purposes of the following description of preferred embodiments, both the breakpoint signal issued over path 230 and the watchpoint signal issued over path 240 can be considered as breakpoint signals, as both signals will cause the processor core to stop processing instructions, thereby enabling the debugger to analyse the current state of the data processing apparatus prior to the execution of the breakpointed instruction. However, in preferred embodiments, separate paths 230, 240 are provided, so that the processor core 100 can determine whether the signal received is a breakpoint signal relating to instructions or a watchpoint signal relating to data.

When the processor core 100 receives a breakpoint signal via the paths 230 or 240, and hence stops processing instructions, it will issue a debug acknowledge signal over path 250 to the embedded ICE unit 150 to inform the embedded ICE unit 150 that it has received the breakpoint signal, and has stopped processing instructions.

In addition to the hardware breakpoint units 200 and 205, the embedded ICE unit 150 also contains a number of control registers 210 containing various items of data used to control the operation of the embedded ICE unit 150. However, in accordance with preferred embodiments of the present invention, a number of extra fields have been added to the control registers 210, these control registers being used by additional elements added to the embedded ICE unit to handle the issuing of breakpoint signals upon the occurrence of certain specified events. These further elements are illustrated in FIG. 4, which provides a more detailed overview of the components within the embedded ICE unit 150.

Figure 4:
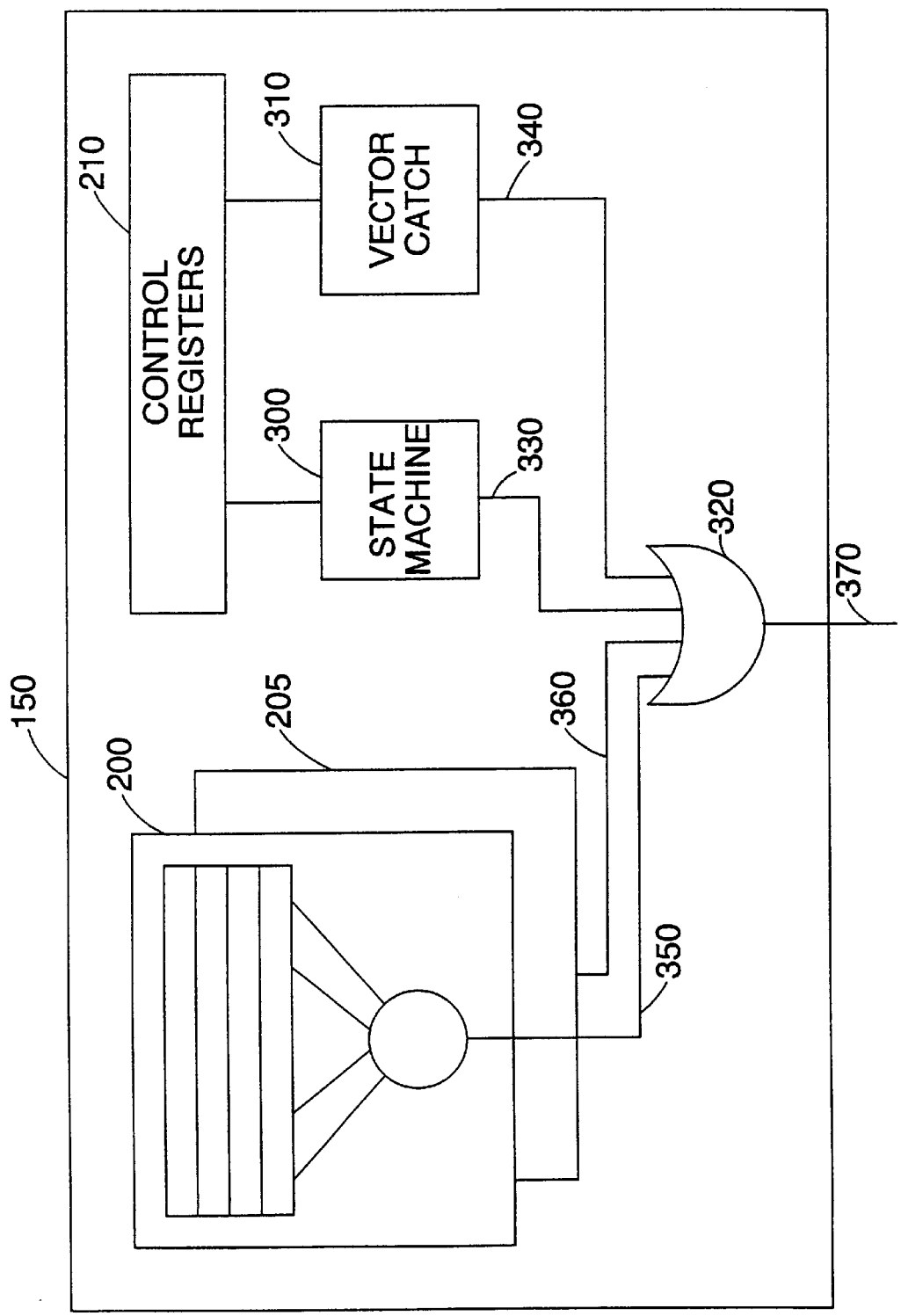
FIG. 4 illustrates the main elements of an embedded ICE unit in accordance with preferred embodiments of the present invention.

As illustrated in FIG. 4, a state machine 300 is provided to enable the debugger to step through the code being executed on the data processing apparatus, such that a predetermined number of instructions are executed, and then the state of the processor and/or memory are examined before the next predetermined number of instructions are executed. In preferred embodiments, this state machine 300 is used to perform a single stepping process through the code, such that the code is executed one instruction at a time, and the state of the processor and/or memory are examined in between each instruction. An extra field is provided within the control register 210 which is accessible by the state machine 300, and is settable to indicate that a stepping process is to be employed. If the field has been set, then the state machine is arranged to keep a record of the number of InMREQ signals issued by the processor core, and after a predetermined number of InMREQ signals have been received, the state machine 300 is then arranged to issue a breakpoint signal over path 330 to the OR gate 320. If the state machine 300 is arranged to perform a single stepping process, then the state machine 300 issues the breakpoint signal once two InMREQ signals have been issued by the processor core. The operation of the state machine 300 will be discussed in more detail later with reference to FIGS. 5 to 7.

In accordance with preferred embodiments of the present invention, the embedded ICE unit 150 also includes vector catch logic 310 which is arranged to identify accesses to exception routines at exception addresses often referred to as "vector" addresses. A number of additional fields are added to the control registers 210, each field corresponding to a particular exception routine, and each field being settable to indicate that the debugger wishes to identify an access to the corresponding exception routine.

The vector catch logic 310 is arranged to receive any InMREQ signals issued by the processor core, and is also arranged to receive a qualifying signal which is set to indicate that the instruction fetch request referred to by the InMREQ signal is actually an instruction fetch request for an instruction of an exception routine. Upon receipt of these signals, the vector catch logic 310 is arranged to use a predetermined number of the bits in the address associated with the InMREQ signal, and the bits stored within the various additional control registers corresponding to each exception routine, to determine which exception routine the address corresponds to. If the instruction fetch command corresponds to an exception routine whose corresponding field in the control register has been set, then the vector catch logic 310 is arranged to issue a breakpoint signal over path 340 to the OR gate 320. A more detailed description of the operation of the vector catch logic 310 will be provided later with reference to FIGS. 8 to 10.

In addition to the breakpoint signals issued by the state machine 300 and the vector catch logic 310, the OR gate 320 is also arranged to receive any breakpoint signals issued over paths 350 and 360 from the hardware breakpoint units 200 and 205. Hence, if any breakpoint signals are issued by the components of the embedded ICE unit 150, then the OR gate 320 will issue a breakpoint signal over the path 370 to the processor core 100.

Since a state machine 300 and vector catch logic 310 have been provided specifically to handle single stepping and the identification of accesses to exception routines, respectively, then the hardware breakpoint units 200 and 205 are free to be used for other purposes, thereby enabling the debugger to perform some additional debugging procedures whilst also performing single stepping or vector catch processes.

It will be appreciated by those skilled in the art that the above described embedded ICE unit 150 in accordance with preferred embodiments of the present invention is not restricted to use with a data processing apparatus having a Harvard architecture as illustrated in FIG. 1. All that is required is for the embedded ICE unit 150 to be arranged to receive information about the instruction accesses and/or data accesses being initiated by the processor core.

Figure 2:
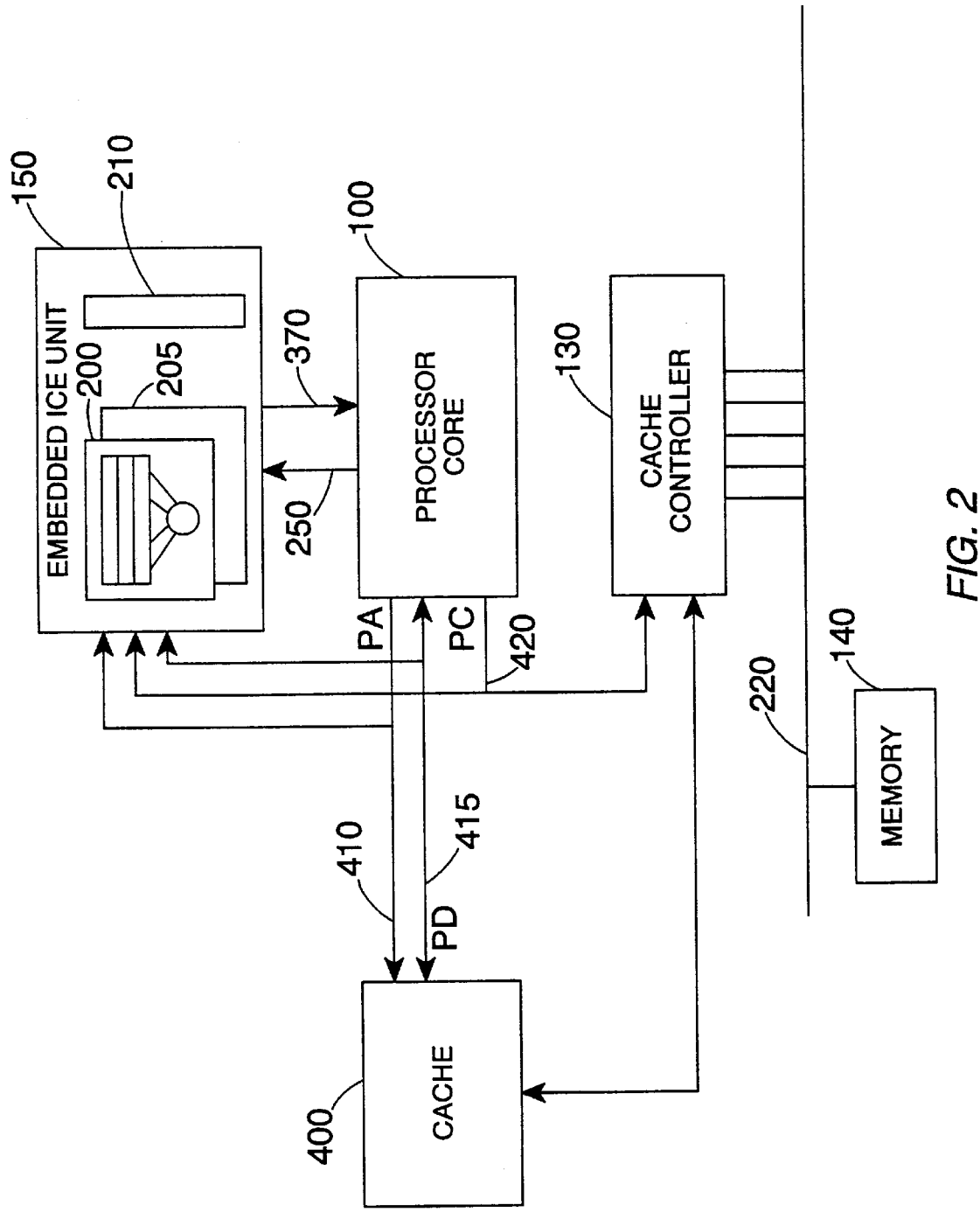
FIG. 2 illustrates a data processing apparatus in accordance with a second embodiment of the present invention, in which the data processing apparatus has a Von Neumann architecture.

Hence, as illustrated in FIG. 2, the embedded ICE unit 150 of preferred embodiments may be used in a data processing apparatus having a Von Neumann architecture, in which a single cache 400 is provided for storing both instructions and data values. In this arrangement, when the processor core 100 requires an instruction or a data value, it places the memory address of that instruction or data value on the processor address (PA) bus 410. Further, the processor core 100 issues a processor control signal on the processor control (PC) bus 420. This processor control signal is received by the cache controller 130, and prompts the cache controller to determine whether the required instruction or data value is stored within the cache 400. Further, an additional control signal is provided distinguishing between instruction and data fetches. The cache controller 130 instructs the cache 400 to compare the address on the address bus 410 with the addresses in the cache to determine whether the instruction or data value corresponding to that address is stored within the cache. If so, that instruction or data value is output from the cache 400 onto the processor data (PD) bus 415, where it is then read by the processor core 100. If the instruction or data value corresponding to the address is not within the cache 400, then the cache controller 130 causes that instruction or data value to be retrieved from memory 140 over the external bus 220. The retrieved instruction or data value is then stored in the cache 400 and returned to the processor core 100 over the data bus 415.

In addition to receiving instructions or data values over the processor data bus 415, the processor core 100 may also output data values over the data bus 415 to the cache 400 for storage in the cache. These data values may then be later retrieved by the processor core 100 when required for subsequent processing operations.

The embedded ICE unit 150 operates in the same way as described earlier with references to FIGS. 1 and 4. Hence, it is connected to the various bus lines 410, 415, 420 in order to receive the necessary information about instruction or data accesses being initiated by the processor core 100. For the purposes of single stepping or vector catching, the embedded ICE unit will only consider the instruction fetches and not the data fetches. As described earlier with reference to FIG. 4, the state machine 300 can then be used to allow the debugger to perform a single stepping process, and the vector catch logic 310 can be used to identify when accesses to exception routines are taking place, and to issue a breakpoint signal to the processor core so as to halt the processing performed by the processor core, and enable the debugger to analyse the state of the processor core and/or memory at that point. When a breakpoint signal is issued to the processor core over the path 370, then the processor core 100 will send a debug acknowledge signal over the path 250 to the embedded ICE unit 150 to confirm that it has halted its processing.

Figure 3:
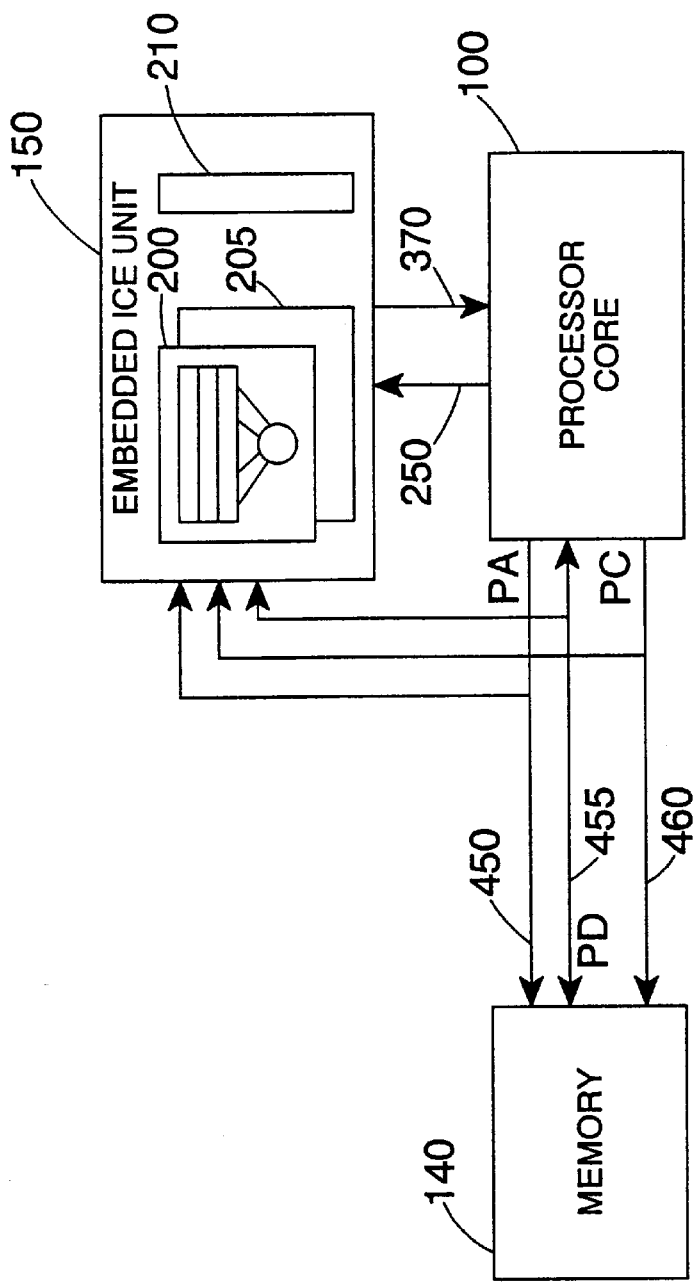
FIG. 3 illustrates a data processing apparatus in accordance with a third embodiment of the present invention, in which the data processing apparatus does not employ a cache, and instead the processor core is arranged to directly access memory.

In addition to being used with a data processing apparatus having either a Harvard architecture or a Von Neumann architecture, the embedded ICE unit 150 of preferred embodiments may also be used with a data processing apparatus having no cache, such a data processing apparatus being illustrated in FIG. 3. As illustrated in FIG. 3, the processor core 100 is connected to a memory 140 via the processor us lines 450, 455, 460. When the processor core 100 requires an instruction or a data value, it places the memory address of that instruction or data value on the processor address (PA) bus 450, and also issues a processor control signal on the processor control (PC) bus 460. The processor control signal is received by the memory 140, and prompts the memory to retrieve the instruction or data value stored at the address output on the PA bus 450. Again, there is an additional control signal provided distinguishing between instruction and data fetches. The retrieved instruction or data value is then output from the memory 140 onto the processor data (PD) bus 455, where it is then read by the processor core 100. In addition to receiving instructions or data values over the PD bus 455, the processor core 100 may also output data values over the PD bus 455 to the memory 140 for storage in the memory.

The embedded ICE unit 150 is connected to the various processor buses 450, 455, 460 in order to receive the necessary information about instruction or data accesses, and then operates in the same manner as described earlier with references to FIGS. 1, 2 and 4.

Having described the general arrangement of the embedded ICE unit 150 in accordance with preferred embodiments of the present invention, the operation of the state machine 300 within the embedded ICE unit 150 will now be described in more detail with reference to FIGS. 5 to 7.

Figure 5:
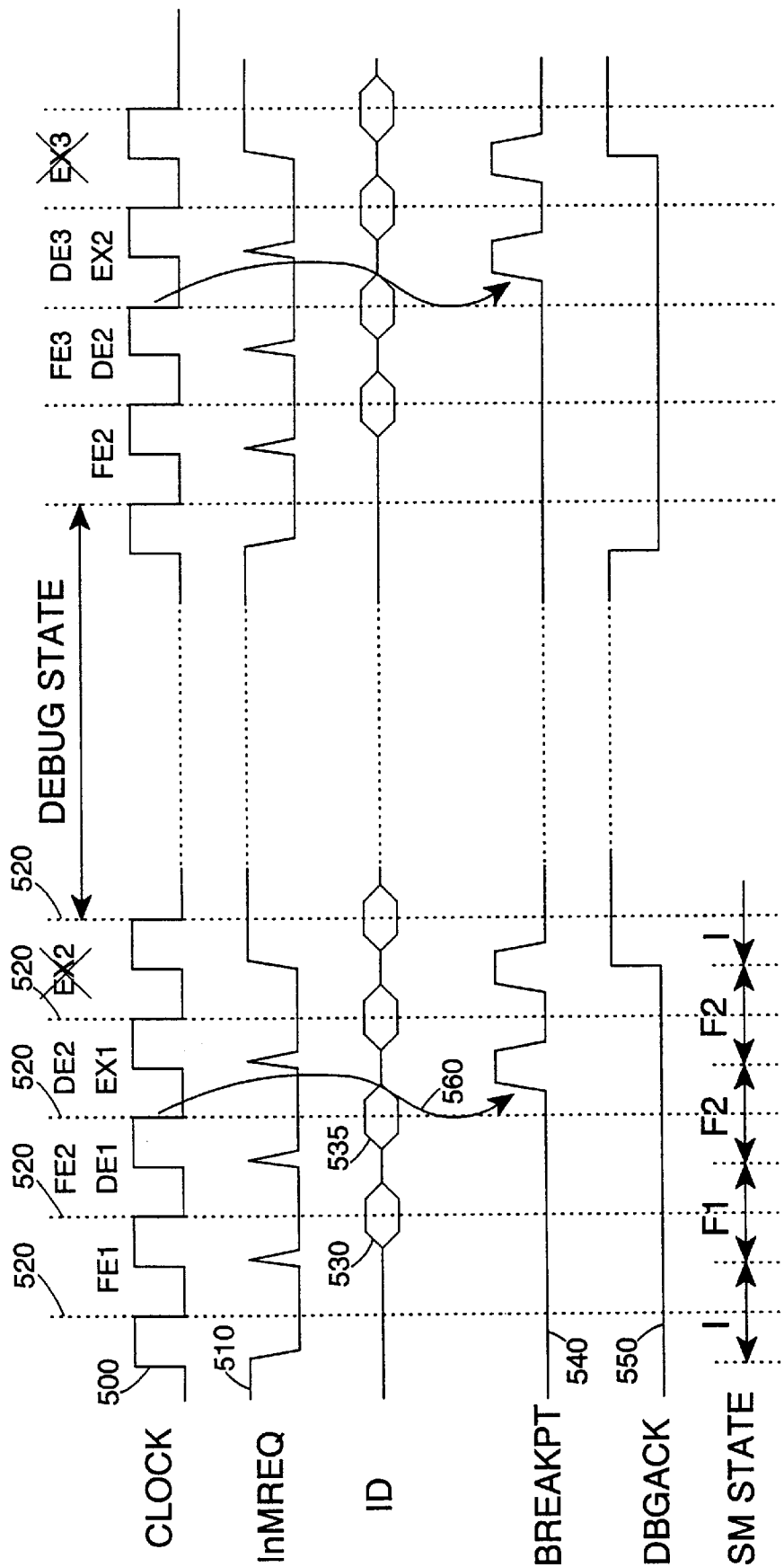
FIG. 5 is a timing diagram illustrating the relationship between the various signals relevant to the state machine of FIG. 4.

FIG. 5 is a timing diagram illustrating the relationship between a number of signals generated by the data processing apparatus of preferred embodiments when operating in a single stepping mode of operation. The vertical lines 520 have been added to indicate the separation between each clock cycle. The state of the state machine 300 (SM STATE) during these various clock cycles is indicated at the bottom of FIG. 5, "I" indicating that the state machine is in the idle state, "F1" indicating that the state machine is in the first fetch state, and "F2" indicating that the state machine is in the second fetch state. These states, and the relationships between them, are illustrated in FIG. 6.

During a first clock cycle "FE1", the processor core is arranged to fetch a first instruction. Hence, on the rising edge of the clock signal 500 during the proceeding clock cycle, the processor core will be arranged to issue an InMREQ signal 510 having a logic "0" value to initiate an instruction fetch, and at the same time will output the address of that instruction on the instruction bus. On the rising edge of the clock in the FE1 clock cycle, the state machine 300 will notice that a first InMREQ signal has been issued by the processor on the control bus, and will hence exit the idle state, and move into the F1 state. At the end of the FE1 clock cycle, the instruction data 530 corresponding to the first instruction fetch request will be returned on the instruction data (ID) bus.

In the next clock cycle, the processor will be arranged to decode the first instruction (represented by the reference DE1 in FIG. 5), and will also fetch a second instruction from memory or cache (represented by the reference FE2 in FIG. 5). Between the rising edge of the clock in the FE1 clock cycle and the rising edge of the clock in the FE2 clock cycle, the InMREQ signal will be asserted on the control bus, and the corresponding address of the instruction will be output on the instruction bus. Further, upon the rising edge of the clock in the FE2 clock cycle, the state machine 300 will note that a second InMREQ signal has been issued, and hence the state machine will move from the F1 state to the F2 state. At the end of this FE2 clock cycle, the instruction data 535 corresponding to the second instruction request will be returned on the instruction data bus to the processor core.

Further, since on the rising edge of the clock in the FE2 clock cycle, the state machine 300 noted that a second InMREQ signal had been issued, and hence a second instruction fetch was taking place, the state machine 300 will be arranged to assert the breakpoint signal 540 upon the falling edge of the clock of the FE2 clock cycle. The relationship between the falling edge of the clock in the FE2 clock cycle, and the issuance of the breakpoint signal 540 is indicated by the arrow 560 in FIG. 5.

In the next clock cycle, the processor 100 will be arranged to execute the first instruction (represented by the reference EX1 in FIG. 5), and will also be arranged to decode the second instruction (represented by the reference DE2 in FIG. 5). Further, the processor will fetch a third instruction from memory or cache, and so a third InMREQ signal will be asserted. On the rising edge of the clock in this clock cycle, the state machine 300 will note that a third InMREQ signal has been issued, and will also note that the debug acknowledge signal 550 from the processor core back to the embedded ICE unit 150 is still low, this indicating that the processor core 100 has not yet stopped processing instructions. In this situation, the state machine will remain in the F2 state as illustrated in FIG. 6, since it will only return to the idle state once the processor has stopped.

Since the state machine 300 has not received a logic "1" level debug acknowledge signal 550, at the end of this clock cycle it will be arranged to re-assert the breakpoint signal 540 in the next clock cycle. Since the first instruction may be, for example, a branch, and hence it cannot automatically be assumed that the second instruction will be executed immediately after the first instruction, the breakpoint signal is preferably re-asserted for each subsequent instruction fetched until the debug acknowledge signal 550 is asserted. Instructions will continue to be fetched until the processor has processed the breakpointed instruction, ie. until that instruction reaches the execution stage of the pipeline, at which point the debug acknowledge signal will be asserted by the processor.

With reference to FIG. 5, since in the next clock cycle, the processor core will have executed the first instruction, and will have received the breakpoint signal 540, the processor core will then be arranged to stop processing instructions, and to issue the debug acknowledge signal 550 on the rising edge of the clock in this next clock cycle. Hence, the second instruction that had been fetched and decoded in the previous clock cycles will not be executed in this clock cycle. Thus, on the rising edge of the clock in this clock cycle, the state machine 300 will note the presence of the debug acknowledge signal 550, indicating that the processor has stopped, and will hence return to the idle state. Then, on the falling edge of this clock cycle, the data processing apparatus will enter the debug state, in which the InMREQ signal stays high indicating that no instruction fetch is taking place, the breakpoint signal 540 will stay low, since the processor core has now responded to the breakpoint signal, and hence the breakpoint signal need no longer be generated, and the debug acknowledge signal 550 will remain high indicating that the processor has stopped.

When the debugger has finished analysing the state of the processor core and/or memory, then the clock will be switched back on, and the debug acknowledge signal 550 will return to the logic "0" level on the first rising edge of the clock. Further, the processor core will issue an InMREQ signal 510 to request that the second instruction be re-fetched. As illustrated in FIG. 5, the whole single stepping process is then repeated for the second instruction, resulting in the data processing apparatus re-entering the debug state once the second instruction has been executed.

Figure 6:
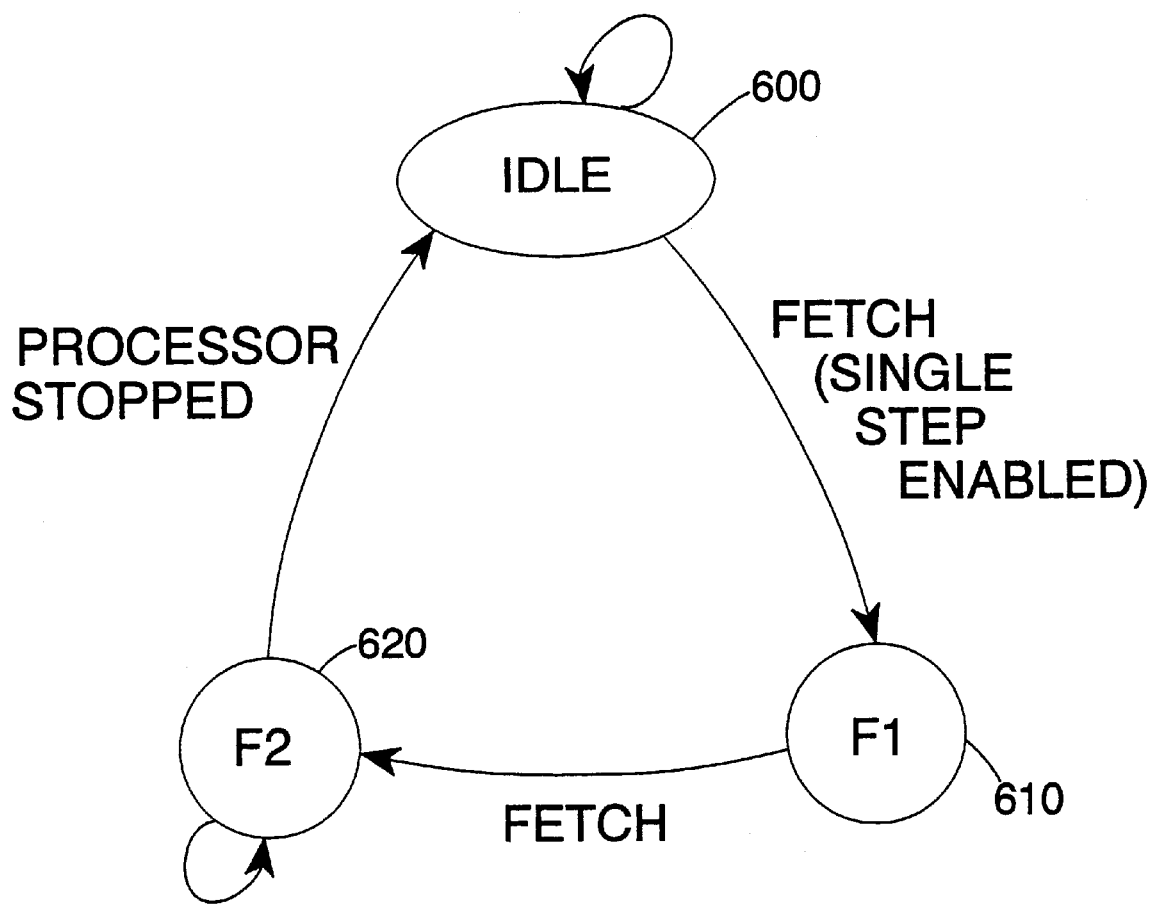
FIG. 6 is a state diagram illustrating the relationship between the various states of the state machine illustrated in FIG. 4.

FIG. 6 summarises the state of the state machine as discussed above with reference to FIG. 5. Hence, the state machine 300 remains in the idle state 600 until the first instruction fetch takes place, at which point the state changes to the F1 state 610. Then, when a second instruction fetch takes place, the state machine moves from the F1 state to the F2 state 620. The state machine 300 then remains in the F2 state 620 until the debug acknowledge signal 550 is received to indicate that the processor has stopped, at which point the state machine returns from the F2 state 620 to the idle state 600.

Figure 7:
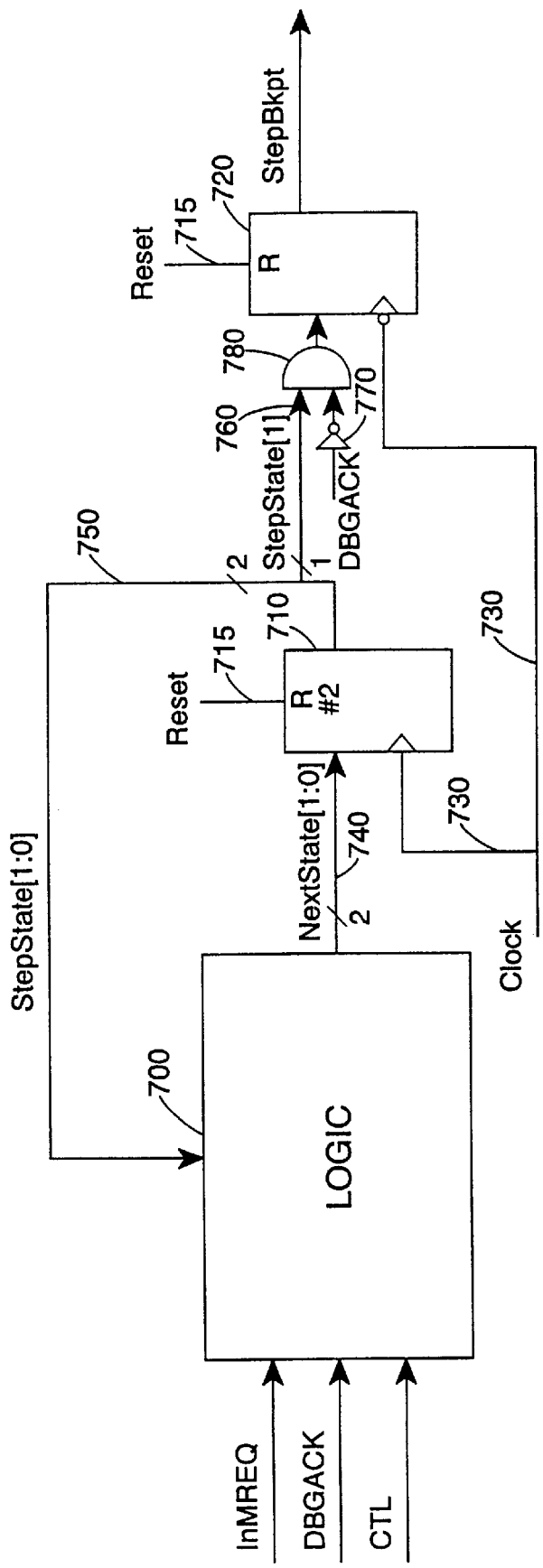
FIG. 7 is a block diagram illustrating elements of the state machine illustrated in FIG. 4.

The circuitry used in preferred embodiments to provide the function of the state machine 300 is illustrated in FIG. 7. The logic 700 is arranged to receive the InMREQ signal, which has a logic "0" value when an instruction fetch is being issued, the debug acknowledge (DBGACK) signal, which has a logic "1" value when the processor has stopped, and a CTL signal, which is the value of the bit in the control register 210 set to indicate whether single stepping is to be employed or not, the CTL signal having a logic "1" value when a single stepping process is to be performed. The logic 700 is also arranged to receive two bits of information representing the state of the state machine, these two bits being referred to as the "StepState". The value of StepState [1:0] is dependent on the "NextState [1:0]" signal output by the logic 700 to indicate the next state of the state machine 300. The relationship between the various input signals to the logic 700 and the value of NextState [1:0] output from the logic 700 in accordance with preferred embodiments of the present invention is illustrated in the following table:

| StepState[1:0] | InMREQ | DBGACK | CTL | NextState[1:0] |
|---|---|---|---|---|
| xx | x | x | 0 | 00 |
| xx | x | 1 | x | 00 |
| 00 | 0 | 0 | 1 | 01 |
| 01 | 0 | 0 | 1 | 10 |
| 10 | 0 | 0 | 1 | 10 |

In the above table, the value "00" corresponds to the idle state of the state machine 300, the value "01" corresponds to the F1 state of the state machine 300, and the value "10" corresponds to the F2 state of the state machine 300.

When the power is first supplied to the data processing circuit, a reset signal is passed over path 715 to the D-type register 710, and also to D-type latch 720. The reset signal causes the D-type register 710 to output the value "00" as the StepState, and causes the D-type latch 720 to reset the "StepBkpt" signal to zero.

With reference to FIG. 5, during the FE1 clock cycle, the InMREQ signal will be low, the DBGACK signal will be low, and the CTL signal will be high, assuming single stepping is to take place. Assuming the step state is "00", then the above table indicates that "NextState" will be "01", corresponding to the F1 state.

The D-type register 710 will receive this NextState value, and will also receive the clock signal over the path 730. On the rising edge of the clock during the FE1 clock cycle, the D-type register 710 will output the NextState value, i.e. "01" as the StepState, this StepState then being input to the logic 700. Further, bit one of the StepState is passed over path 760 to the AND gate 780. The AND gate 780 is also arranged to receive the inverted DBGACK signal (via inverter 770). Since the first bit of the StepState signal is, in this case, zero, the signal output by the AND gate 780 will be zero.

The D-type latch 720 will receive the output from the AND gate 780, and also the clock signal 730, and on the falling edge of the clock in the FE1 clock cycle, will output the signal received from the AND gate 780 as the signal StepBkpt. Since the signal from the AND gate 780 is, in this case, zero, the StepBkpt signal is also zero.

In the next clock cycle, InMREQ and DBGACK will both be low, CTL will remain high, and now the StepState is "01". As illustrated in the above table, the next state output by the logic 700 will hence be "10". Hence, on the rising edge of the clock in this next clock cycle, the state "10" will be output as the StepState by the D-type register 710, this corresponding to the F2 state of the state machine 300.

The AND gate 780 will receive a logic "1" value from the inverter 770, since the DBGACK signal is zero. Further, since the first bit of this StepState value is "1", then the AND gate will also receive a logic "1" signal at its second input, and so will output a logic "1" signal to the D-type latch 720. Hence, a logic "1" signal will be output as the StepBkpt signal upon the falling edge of the clock cycle by the D-type latch 720. This StepBkpt signal is the signal output by the state machine 300 over the path 330 to the OR gate 320, as illustrated in FIG. 4, and this will result in a breakpoint signal being issued to the processor core.

In the third clock cycle, InMREQ and DBGACK will once again remain low, CTL will be high, and now the StepState signal will be "10". As indicated by the last line in the table, the next states output by the logic 700 will remain at the value "10", and hence on the falling edge of this clock cycle, the StepBkpt signal will once again have a "1" value.

This state of affairs will persist until such time as the processor core issues a high DBGACK signal to indicate that the processor has stopped. As indicated by the second entry in the above table, irrespective of the values of the StepState, the InMREQ signal, or the CTL signal, the presence of a high DBGACK signal will cause the next state output by the logic 700 to be "00". Further, since the inverted DBGACK signal is also supplied to the AND gate 780, this will cause the AND gate to output a zero value irrespective of the value of StepState[1]. Hence, on the falling edge of the clock cycle, the StepBkpt signal will return to a "0" value.

Having described the operation of the state machine 300, the operation of the vector catch logic 310 provided within the embedded ICE unit 150 in accordance with preferred embodiments will now be described in more detail with reference to FIGS. 8 to 10.

Figure 8:
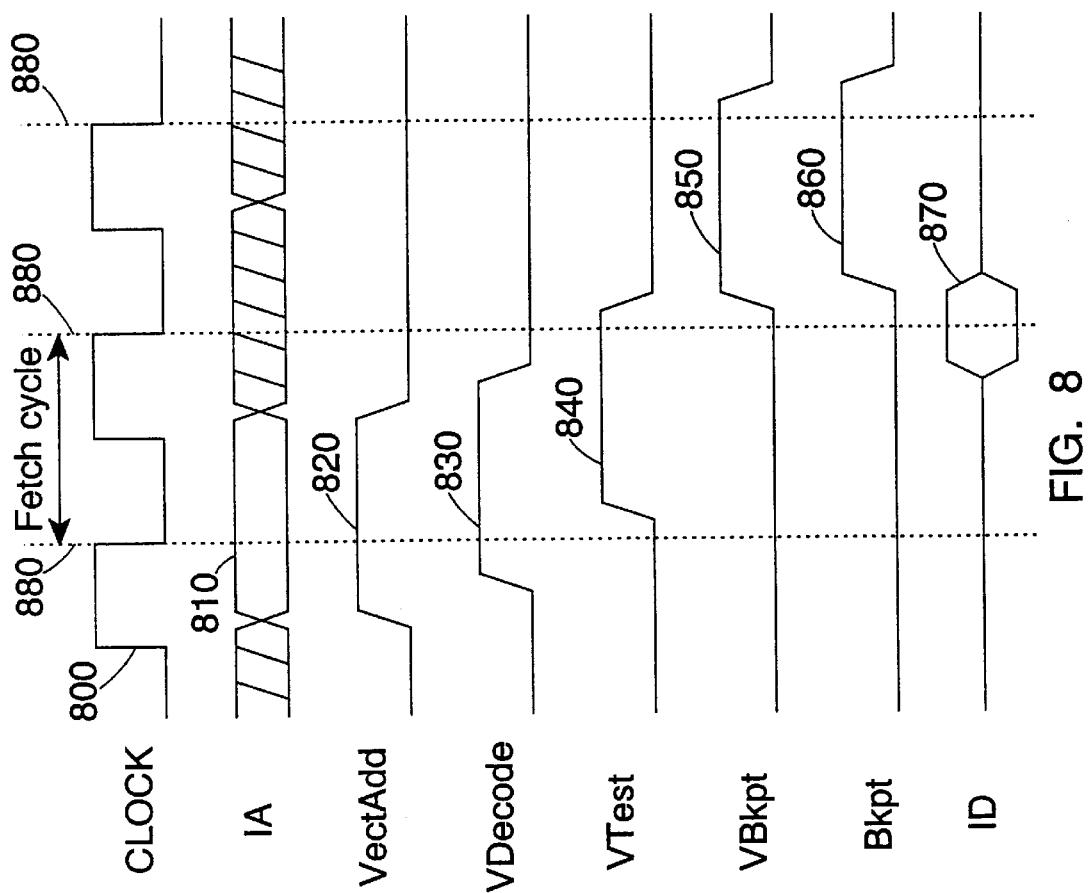
FIG. 8 is a timing diagram illustrating the relationship between the various signals relevant to the vector catch logic illustrated in FIG. 4.

FIG. 8 is a timing diagram illustrating the various signals generated by the data processing apparatus of preferred embodiments when employing the vector catch logic 310 to identify an access to an exception routine when exceptions, for example data aborts, occur. The interaction of the various signals illustrated in FIG. 8 are further illustrated in FIG. 9, which is a block diagram illustrating the main elements of the vector catch logic 310.

The vertical lines 880 in FIG. 8 have been included to illustrate the separation between the various clock cycles. In the event that an exception occurs, the processor core 100 will be arranged to issue an instruction fetch request to retrieve the first instruction of an exception routine used to handle that exception. Hence, in addition to issuing the InMREQ signal, the processor core will also issue the address 810 on the instruction address bus, this address corresponding to the address of the first instruction in the exception routine. At the same time, a qualifying signal will also be output by the processor core 100, preferably this qualifying signal being output on the control bus in addition to the InMREQ signal, this signal indicating that the instruction fetch relates to an instruction of an exception routine. In preferred embodiments, this qualifying signal is referred to as a "VectAdd" signal, and is illustrated in FIG. 8 by the line 820.

Figure 9:
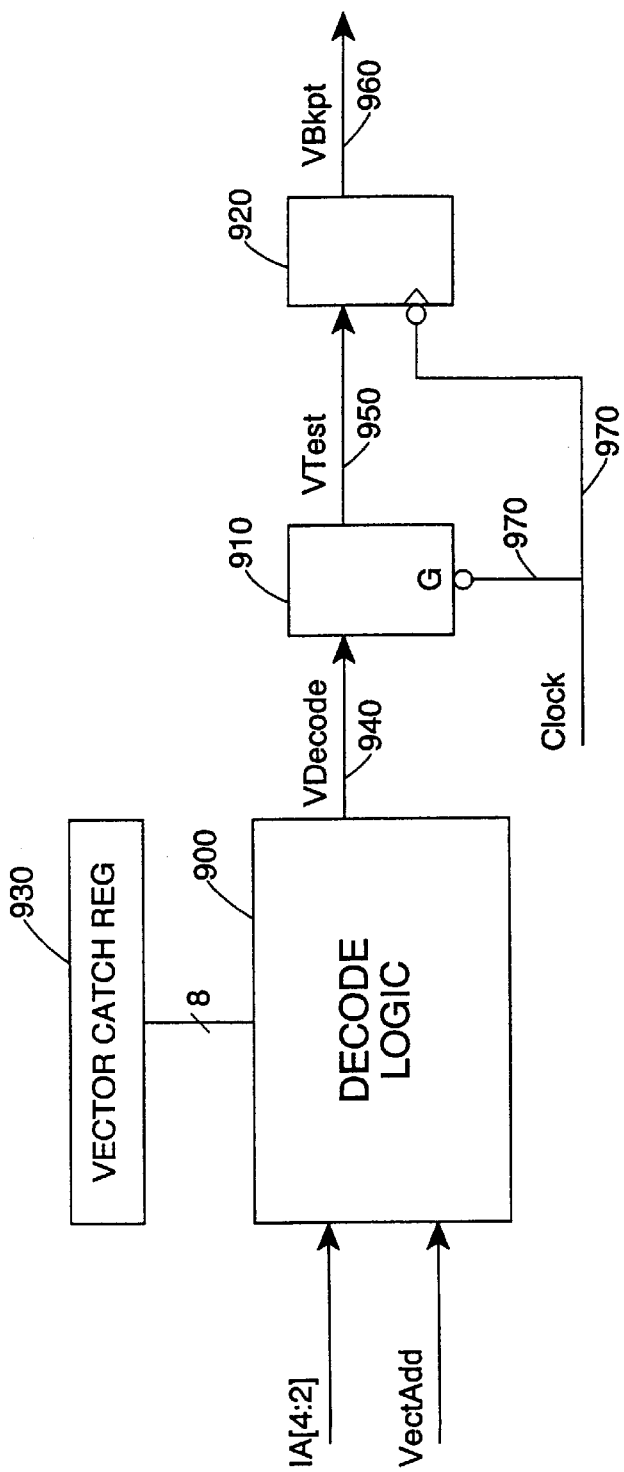
FIG. 9 is a block diagram illustrating elements of the vector catch logic illustrated in FIG. 4.

As illustrated in FIG. 9, the instruction address information and the VectAdd signal are input to decode logic 900 within the vector catch logic 310. In preferred embodiments, only bits 4 to 2 of the instruction address are input into the decode logic 900, since in preferred embodiments only these bits are required in order to determine which exception routine is being accessed. However, it will be appreciated by those skilled in the art that any number of the bits of the instruction address may be provided to the decode logic 900, as required.

The decode logic 900 also has access to the vector catch registers 930, these being the extra fields of the control registers 210 within the embedded ICE unit 150 referred to earlier with reference to FIG. 4. In preferred embodiments, there are eight exception routines, and hence eight fields within the vector catch register 930. Further, each field preferably contains one bit which is settable to indicate whether the debugger wishes to identify an access to the corresponding exception routine.

Assuming the VectAdd signal is high, indicating that an access to an exception routine is taking place, then the decode logic 900 is arranged to use bits 4 to 2 of the address, and the corresponding bits from the vector catch registers 930 to determine which exception routine is being accessed, and further whether the corresponding bit in the vector catch registers 930 has been set. The actual logic contained within the decode logic 900 in preferred embodiments of the present invention to perform the above function will be described in detail later with reference to FIG. 10.

Assuming the corresponding bit in the vector catch register 930 indicates that the debugger does wish to identify an access to the determined exception routine, then a "VDecode" signal is output by the decode logic 900 over path 940 to a D-type latch 910. This VDecode signal is illustrated by the line 830 in FIG. 8, and it will be seen that it is of a similar form to the VectAdd signal, but displaced in time due to the time taken by the decode logic 900 to perform the necessary processing.

The D-type latch 910 is also arranged to receive the clock signal over the path 970 and hence on the falling edge of the clock is arranged to output the VDecode signal as a "VTest" signal over the path 950. This VTest signal is illustrated by the line 840 in FIG. 8, and it will be seen that the VTest signal is output after the falling edge of the clock indicating the beginning of the fetch cycle.

The VTest signal is received by another D-type latch 920, which is also arranged to receive the clock signal over path 970. Hence, upon the falling edge of the clock at the end of the fetch cycle, the D-type latch 920 is arranged to output the VTest signal as a "VBkpt" signal over path 960, this VBkpt signal corresponding to the signal output by the vector catch logic 310 over the path 340 to the OR gate 320, as illustrated earlier with reference to FIG. 4. Hence, the OR gate 320 within the embedded ICE unit 150 illustrated in FIG. 4 will be arranged to output the breakpoint signal upon receipt of the VBkpt signal from the vector catch logic 310. The VBkpt signal is illustrated by the line 850, and the breakpoint signal is illustrated by the line 860, in FIG. 8. It can be seen from FIG. 8 that the breakpoint signal 860 is issued fractionally after the VBkpt signal 850, due to the time taken for the signal to pass from the vector catch logic 310 to the OR gate 320, and be processed by the OR gate 320.

Finally, with reference to FIG. 8, the instruction data 870 corresponding to the address 810 issued on the instruction address bus is returned to the processor core on the instruction data bus towards the end of the fetch cycle.

From the above description of FIGS. 8 and 9, it will be appreciated that the above approach ensures that the breakpoint signal is asserted in the clock cycle immediately following the fetch cycle during which an exception routine instruction is fetched. Hence, the processor core will be forced to stop processing prior to execution of that instruction. Since, by its nature, an exception routine instruction will be executed without delay, it is sufficient just to assert the breakpoint signal once as illustrated in FIG. 8.

Figure 10:
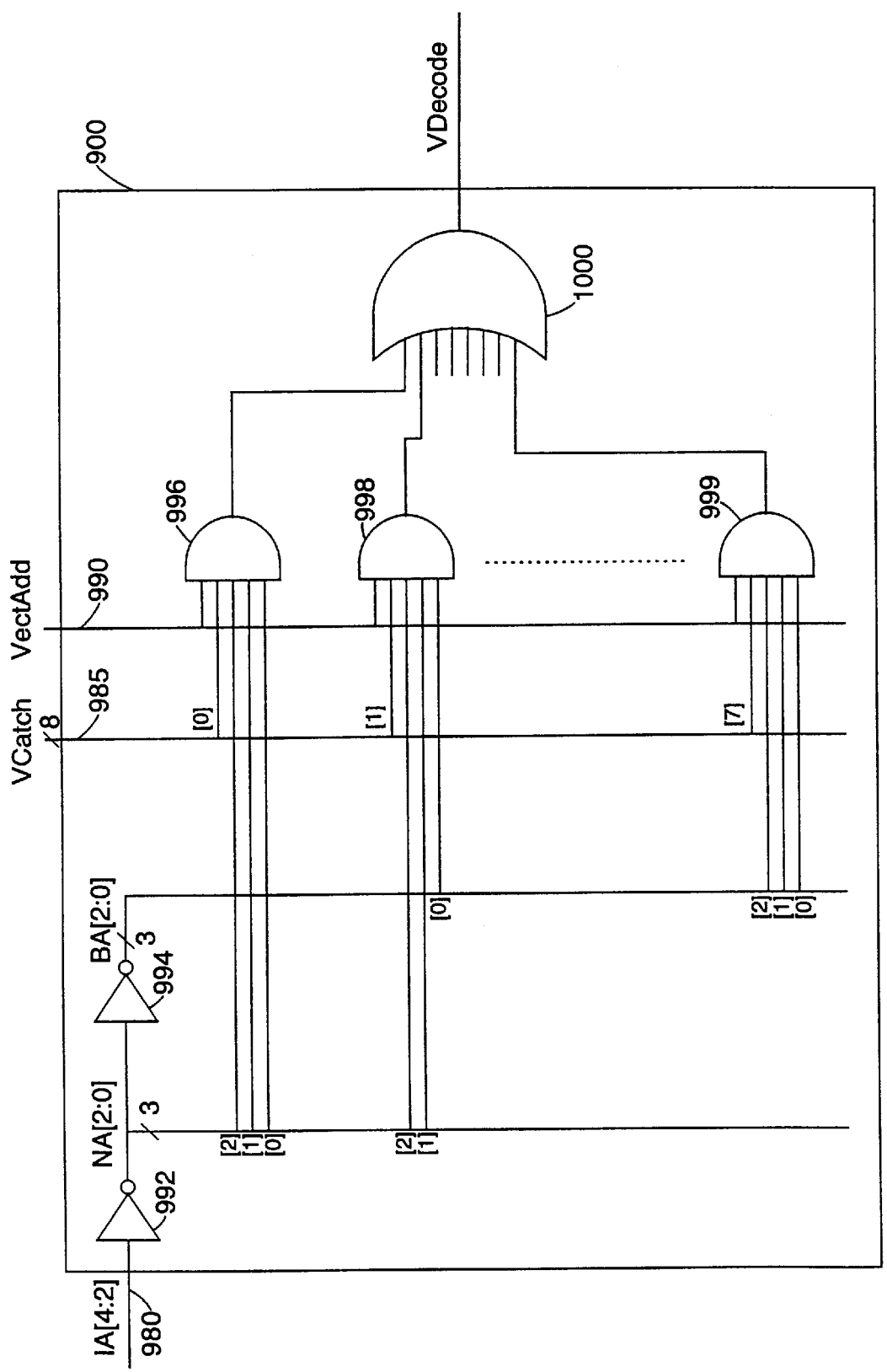
FIG. 10 is a diagram illustrating the logic contained within the decode logic of FIG. 9.

FIG. 10 illustrates in more detail the decode logic 900 shown in FIG. 9. As illustrated in FIG. 10, the decode logic 900 receives bits 4 to 2 of the instruction address over path 980, receives the VectAdd signal over path 990, and receives the eight bits from the vector catch register over the path 985. The bits 4 to 2 of the instruction address are inverted by the inverter 992 to form an inverted address NA [2:0], and this signal is then inverted again to form the buffered addressed bits BA [2:0].

In preferred embodiments, the first exception routine will be being accessed if bits 4 to 2 of the instruction address are all "0", and hence if bits 2 to 0 of the NA signal are all "1"s. Further, bit 0 of the vector catch registers 930 corresponds to this exception routine, and hence bit 0 of the vector catch register is passed to AND gate 996, along with bits 2 to 0 of the NA signal. Further, the AND gates 996 receive the VectAdd signal over path 990, this being high whenever an instruction fetch to an exception routine is taking place.

Hence, with reference to FIG. 10, it will be appreciated that the AND gate 996 will only output a level "1" signal if bits 2 to 0 of the NA signal are high, if bit 0 of the vector catch register is high (to indicate that the debugger wishes to identify an access to the first exception routine), and if the VectAdd signal is high to indicate that an access to an exception routine is taking place.

Similar AND gates 998, 999 are provided for each of the other seven bits of the vector catch register 930, these AND gates 998, 999 also being arranged to receive selective bits from either the NA signal or the BA signal, depending on the particular exception routine. Hence, as an example, the second exception routine will be being accessed if bits 4 and 3 of the instruction address are 0, and bit 2 of the instruction address is 1. In that instance, bits 2 and 1 of the NA signal will be high, and bit 0 of the BA signal will be high, and hence these bits are routed to the AND gate 998 in addition to bit 1 of the vector catch register. It will hence be appreciated that if the second exception routine is being accessed, and bit 1 of the vector catch register has been set high to indicate that the debugger is interested in identifying an access to that second exception routine, then the AND gate 998 will issue a high signal to the OR gate 1000 so long as the VectAdd signal is high to indicate that an access to an exception routine is taking place.

As a final example, the eighth exception routine will be being accessed if bits 4 to 2 of the instruction address are all high, and hence if bits 2 to 0 of the BA signal are high. Hence, AND gate 999 is arranged to receive bits 2 to 0 of the BA signal, and bit 7 of the vector catch register 930. Hence if that bit of the vector catch register has been set, and the corresponding bits 2 to 0 of the BA signal are high, then the AND gate 999 will output a logic "1" signal to the OR gate 1000, assuming the VectAdd signal is high, to indicate that an access to an exception routine is taking place.

Whenever the OR gate 1000 receives a logic "1" signal from any of the AND gates 996, 998, 999, it will output the VDecode signal as a logic "1" value.

From the above description of a data processing apparatus in accordance with preferred embodiments of the present invention, it will be appreciated that the provision of a dedicated state machine 300 and vector catch logic 310 to perform single stepping functions and identification of accesses to exception routines, respectively, provides a particularly efficient technique for handling these common debugging requirements, whilst leaving any general hardware breakpoint units provided within the embedded ICE unit free to be used for other purposes.

Although a particular embodiment has been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

We claim:

1. A debugger interface unit for identifying accesses to selected exception routines within a data processing apparatus, comprising:

a control register having a number of fields, each field corresponding to a particular exception routine, and each field being settable to indicate that the debugger wishes to identify an access to the corresponding exception routine;

an exception routine catch logic arranged to determine from an instruction address issued with an instruction fetch command which exception routine is indicated by the instruction address and being arranged to receive a first signal indicating that the instruction fetch command is an instruction fetch command for an exception routine issued by a processor core within the data processing apparatus;

the catch logic further being arranged to reference the field of the control register corresponding to the determined exception routine to determine if that field has been set;

the catch logic being arranged to issue a breakpoint signal if an exception routine is determined from the instruction address, if the first signal is received by the exception routine catch logic, and if the field corresponding to the determined exception routine is set.

2. A debugger interface unit as claimed in claim 1, wherein the first signal is a signal output by the processor core on a control bus to request an instruction fetch for an exception routine to be performed.

3. A debugger interface unit as claimed in claim 2, wherein the first signal consists of a signal output by the processor core to indicate that an instruction fetch is required and a qualifying signal to indicate that the instruction fetch relates to an exception routine.

4. A debugger interface unit as claimed in claim 1, wherein each field contains a single bit to indicate whether the debugger wishes to identify an access to the corresponding exception routine.

5. A debugger interface unit as claimed in claim 1, wherein the catch logic is arranged to determine from predetermined bits of the instruction address issued with the instruction fetch command which exception routine the instruction fetch command relates to.

6. A debugger interface unit as claimed in claim 1, further comprising:

an input terminal for receiving information about instruction or data accesses being initiated by the processor core;

one or more hardware breakpoint units, each breakpoint unit having a number of breakpoint registers for storing attributes of instruction or data accesses that are to cause the breakpoint signal to be sent to the processor core, and a breakpoint comparator for comparing the attributes in the breakpoint registers with the information received at the input terminal;

each breakpoint unit being arranged to issue said breakpoint signal if the breakpoint comparator matches the attributes in the breakpoint registers with corresponding attributes contained in the information received by the input terminal.

7. A debugger interface unit as claimed in claim 6, wherein the input terminal is connected to an address bus, a data bus, and a control bus for receiving the information about instruction or data accesses being initiated by the processor core.

8. A debugger interface unit as claimed in claim 6, further comprising a logic gate for receiving the breakpoint signal issued by any of the breakpoint units or the catch logic, and for outputting a single signal to the processor core.

9. A debugger interface unit as claimed in claim 6, further comprising an interface for receiving attributes from a debugger for storing in the breakpoint registers.

10. A debugger interface unit as claimed in claim 1, wherein the control register has a further field settable to indicate that a stepping process is to be employed, the debugger interface further comprising:

a state machine arranged to receive a second signal when a processor core within the data processing apparatus requests an instruction fetch to take place, the state machine being arranged to keep a record of the number of instruction fetches requested by the processor core;

the state machine further being arranged to reference the control register to determine whether the further field has been set, and, if the further field has been set, to output the breakpoint signal to the processor core once a predetermined number of instruction fetches have been requested by the processor core.

11. A debugger interface unit as claimed in claim 10, wherein the predetermined number of instruction fetches is two, and the stepping process is a single stepping process.

12. A debugger interface unit as claimed in claim 10, wherein the second signal is a signal output by the processor core on a control bus to request an instruction fetch to be performed.

13. A data processing apparatus, comprising:

a processor core for executing instructions; and a debugger interface unit for identifying accesses to selected exception routines within a data processing apparatus, comprising:

a control register having a number of fields, each field corresponding to a particular exception routine, and each field being settable to indicate that the debugger wishes to identify an access to the corresponding exception routine;

an exception routine catch logic arranged to determine from an instruction address issued with an instruction fetch command which exception routine is indicated by the instruction address and being arranged to receive a first signal indicating that the instruction fetch command is an instruction fetch command for an exception routine issued by a processor core within the data processing apparatus;

the catch logic further being arranged to reference the field of the control register corresponding to the determined exception routine to determine if that field has been set;

the catch logic being arranged to issue a breakpoint signal if an exception routine is determined from the instruction address, if the first signal is received by the exception routine catch logic, and if the field corresponding to the determined exception routine is set.

14. A data processing apparatus as claimed in claim 13, further comprising:

an instruction cache for storing instructions;

a data cache for storing data;

an instruction address bus and an instruction data bus being arranged to connect the instruction cache with the processor core, the instruction address bus enabling the processor core to output instruction addresses to the instruction cache, and the instruction data bus enabling the processor core to receive instructions corresponding to those instruction addresses; and a data address bus and a data data bus being arranged to connect the data cache with the processor core, the data address bus enabling the processor core to output data addresses to the data cache, and the data data bus enabling the processor core to receive data values corresponding to those data addresses, or to output data values to the data cache.

15. A data processing apparatus as claimed in claim 14, wherein the debugger interface unit comprises:

an input terminal for receiving information about instruction or data accesses being initiated by the processor core;

one or more hardware breakpoint units, each breakpoint unit having a number of breakpoint registers for storing attributes of instruction or data accesses that are to cause the breakpoint signal to be sent to the processor core, and a breakpoint comparator for comparing the attributes in the breakpoint registers with the information received at the input terminal;

each breakpoint unit being arranged to issue said breakpoint signal if the breakpoint comparator matches the attributes in the breakpoint registers with corresponding attributes contained in the information received by the input terminal; and wherein the input terminal of the debugger interface unit is connected to the instruction address bus and the instruction data bus for enabling the one or more hardware breakpoint units to receive the necessary information about instruction accesses required by the breakpoint comparator.

16. A data processing apparatus as claimed in claim 15, wherein the input terminal of the debugger interface unit is connected to the data address bus and the data data bus for enabling the one or more hardware breakpoint units to receive the necessary information about data accesses required by the breakpoint comparator.

17. A method of operating a debugger interface unit for a data processing apparatus to identify an access to an exception routine, comprising the steps of:

(a) providing a number of fields within a control register, each field corresponding to a particular exception routine;

(b) setting one of said fields to indicate that the debugger wishes to identify an access to the corresponding exception routine;

(c) determining from an instruction address issued with an instruction fetch command which exception routine is indicated by the instruction address;

(d) receiving a first signal when the instruction fetch command is an instruction fetch command for an exception routine by a processor core within the data processing apparatus;

(e) determining if the field of the control register corresponding to the exception routine determined at said step (c) has been set; and (f) outputting a breakpoint signal if an exception routine is determined at said step (c), if the first signal is received, and if the field corresponding to the determined exception routine is set.

* * * * *